United States Patent [19]

Varma et al.

[11] 4,276,344
[45] Jun. 30, 1981

[54] PHOSPHORUS-CONTAINING BISIMIDE RESINS

[76] Inventors: Robert A. Frosch, Administrator of the National Aeronautics and Space Administration, with respect to an invention of Indra K. Varma, George M. Fohlen, John A. Parker

[21] Appl. No.: 175,452

[22] Filed: Aug. 5, 1980

[51] Int. Cl.³ ............................................. B32B 7/00
[52] U.S. Cl. ..................................... 428/260; 428/367; 428/408; 428/902; 428/920; 526/262; 528/228; 528/322
[58] Field of Search ................ 526/262; 528/228, 322; 428/260, 367, 408, 902, 920

[56] References Cited

U.S. PATENT DOCUMENTS 2,444,536  7/1948  Searle ..................... 260/326.5 FM

*Primary Examiner*—James J. Bell
*Attorney, Agent, or Firm*—Darrell G. Brekke; John R. Manning

[57] ABSTRACT

Fire-resistant resins particularly useful for making laminates with inorganic fibers such as graphite fibers, are made by (1) condensation of an ethylenically unsaturated cyclic anhydride with a bis(diaminophenyl)phosphine oxide, and (2) by addition polymerization of the bisimide so obtained. Up to about 50%, on a molar basis, of benzophenonetetracarboxylic acid anhydride can be substituted for some of the cyclic anhydride to alter the properties of the products. Graphite cloth laminates made with these resins have shown 800° C. char yields greater than 70% by weight in nitrogen. Limiting oxygen indexes (LOI) of more than 100% have been determined for these resins, as per ASTM D 2863-4.

6 Claims, No Drawings

PHOSPHORUS-CONTAINING BISIMIDE RESINS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This invention relates to addition polyimide resins and to fiber or fabric-reinforced composites made from them.

BACKGROUND ART

Strong light-weight composites can be made by embedding various types of fibers or fabrics in a resin matrix. The polymer used for such a matrix is generally an epoxy resin, although several other resins such as phenolic, novolac, poly(ether sulfone), poly(phenyl sulfone), and bismaleimide resins have also been used for certain applications. As fibers or fabrics, carbon and graphite products have been quite useful in the composite structures.

The search for flame resistant materials to form laminates that can be used with greater safety in places such as aircraft cabins, has led to the selection of high temperature resins such as bismaleimides which have a high anaerobic char yield (Scientific & Technological Aerospace Reprints, 1976, 14–16, (Abstract N76-25354)), and to the inclusion of phosphorus-containing compounds either in a mixture with or as an integral part of the resin used as matrix. Searle, in U.S. Pat. No. 2,444,536, discloses a widely used method for the preparation of maleimide polymers. As to the use of phosphorus-containing compounds, Kourtides et al. (Proceedings of the Adhesive for Industry Conference, El Segundo, Calif., June 24–25, 1980) have shown substantial improvement in various properties of certain epoxy resins by preparing them with bis(3-aminophenyl)methylphosphine oxide or its bisphenol analog, instead of the conventional diamine or phenol monomers or curing agents of the art. In summary, however, it can be stated that while the introduction of phosphorus into organic polymers has generally resulted in reduced flammability, increased adhesion, and better solubility in polar solvents, none of the resins used in the composite art are nonflammable.

The principal object of the present invention is to provide greatly improved new phosphorus-containing matrix resins that can be used for the fabrication of improved graphite fiber or cloth composites, and adhesives.

DISCLOSURE OF THE INVENTION

The objects of this invention have been accomplished by the preparation of bisimides containing phosphorus in the main chain as well as olefinic endgroups which can be thermally polymerized to form resins and laminates that can be virtually incombustible in pure oxygen at 300° C.

The bisimides are formed by condensation of an unsaturated cyclic aliphatic dibasic acid anhydride such as maleic anhydride with a bis(aminophenyl)alkylphosphine oxide. Aromatic dianhydrides such as benzophenonetetracarboxylic acid dianhydride may be incorporated into the bisimides to lengthen the ultimate polymeric chain.

DETAILED DESCRIPTION OF THE INVENTION

The bisimides of the invention are condensation products of an unsaturated cyclic anhydride with a phosphorus-containing aromatic diamine, as illustrated by the following reactions:

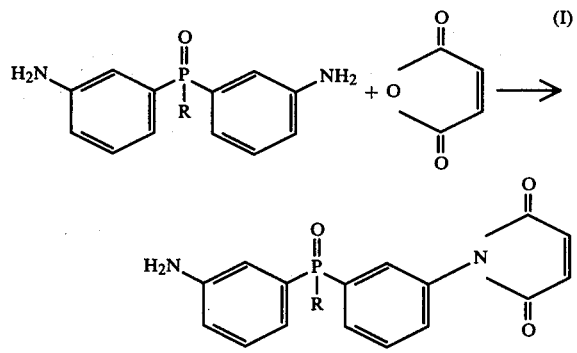

The monoimide formed can be converted further to the bisimide by reaction with more maleic anhydride. On the other hand, it may be condensed with an aromatic dianhydride to produce a larger polymerizable molecule:

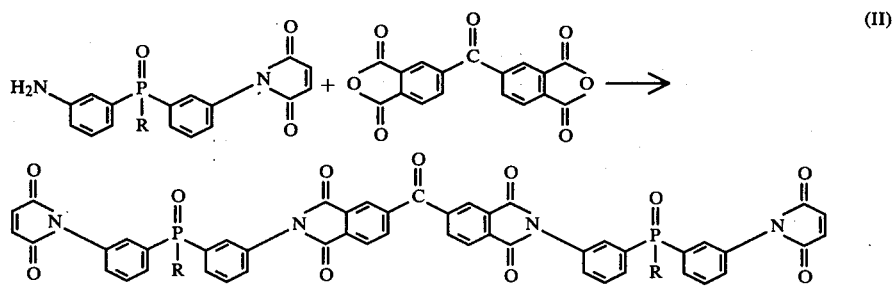

In addition to the maleic anhydride shown in the above reactions, there can be used similar unsaturated cyclic anhydrides such as dichloromaleic anhydride, citraconic anhydride, as well as other substituted maleic anhydrides in which the hydrogen atoms have been replaced by lower alkyl groups or halogen atoms, preferably chlorine or fluorine.

The phosphine oxide component of the bisimides of this invention is a bis(aminophenyl) type as shown by the formula in reaction I in which R stands for a methyl, ethyl or phenyl group. The preferred phosphine oxide, that with the methyl group, can be made by the method of Arbuzov et al. [Zh. Obshch. Khim. 18, 2008 (1948)] which involves the reaction of triphenylphosphine with methyl iodide, followed by treatment with potassium hydroxide, nitration, and reduction of the nitro groups to amino groups.

The process for making bisimides from the compounds just discussed has been disclosed by Searle (U.S. Pat. No. 2,444,536), as mentioned earlier. Reactions I and II take place preferably in a polar solvent such as dimethylformamide and the product is generally isolated by pouring the reaction mixture in a non-solvent liquid. The reactants, i.e. the diamine and the anhydride components are used in substantially stoichiometric proportions, although an excess of up to 10% of either component may be employed if desired. The resulting bisimides can be cured at temperatures preferbly within the range of 235° to 290° C. The resins produced according to the process just described are suitable for many applications in which good adhesion and excellent resistance to heat, fire, solvents, and chemicals are required. In the aerospace industry, the new resins may be used as adhesives and as matrix material for fiber-reinforced light-weight composites.

To fabricate one type of composite, preimpregnated fabrics are first prepared by coating a graphite cloth, e.g. an 8-harness satin-weave designed as style 133 fabric, with a solution of a bismaleimide in dimethylformamide, and dried at 160°–170° C. in a ventilated oven for 15 minutes. The dried prepregs are then stacked (4 or 9) plies and pressed between aluminum plates covered with a polytetrafluoroethylene release film. The resulting laminate is then cured in a flat platen press at 232° C. at a pressure of 125 psi for 95 minutes. Post curing is done at 300° C. for 70 minutes.

The invention will now be illustrated in operational detail by the following examples which are not intended to limit its scope as defined in the appended claims.

EXAMPLE 1

Bis(3-aminophenyl)methylphosphine oxide, 4.92 g (20 mmol), was placed in a flask with dimethylformamide, 20 ml. This was stirred until a solution was obtained. Maleic anhydride, 4.312 g (44 mmol), was added in two portions over a period of ten minutes and the resulting solution was kept stirring overnight at room temperature and then for 35 minutes longer at 145°±5° C. The bismaleimide produced was precipitated by pouring the solution, after cooling, into ice-cold water. The product was purified from methanol and petroleum ether. Elemental analysis showed the following results: C, 61.8%; H, 3.8%; N, 6.9%; P, 7.2%; and O, 19.2%. These values substantially correspond to those calculated for the formula $C_{21}H_5O_5N_2P_1$ namely: C, 62.1%; H, 3.7%; N, 6.9%; P, 7.6%; and O, 19.7%.

EXAMPLE 2

In this preparation, benzophenonetetracarboxylic dianhydride (BTDA) was substituted for half of the maleic anhydride used in Example 1.

The diamine, of Example 1, 4.92 g (20 mmol), was again dissolved in the formamide, 20 ml, and maleic anhydride, 2.15 g (22 mmol), added in two portions. The solution was stirred for one hour. BTDA, 3.54 g (11 mmol), was introduced and stirring was continued overnight. After further stirring at 145°±5° C. for 50 minutes, the solution was cooled and poured in water. The precipitated bismaleimide was purified from methanol:acetone and petroleum ether. Elemental analysis results were: C, 63.8%; H, 3.88%; N, 5.7%; and P, 6.23%. Values calculated for the formula $C_{15}H_{32}O_{11}N_4P_2$: C, 65.24%; H, 3.41%; N, 5.97%; P, 6.6%; and O, 18.7%.

EXAMPLE 3

Dichloromaleic anhydride, 1.66 g (11 mmol), was used here with the diamine of Example 1, 1.23 g (5 mmol). These materials were dissolved separately in glacial acetic acid at room temperature and the solutions were mixed and refluxed gently during 2.5 hours. After cooling, the solution was poured in water and the precipitated imide was purified from toluene: acetone and hexane. Elemental analysis showed: C, 47.02%; H, 2.23%; N, 5.43%; P, 5.72%; and Cl, 25.10%. The value calculated for $C_{21}H_{11}Cl_4O_5N_2P$ were C, 46.5%; H, 2.0%; N, 5.2%; P, 5.7%; and Cl, 25.8%.

EXAMPLE 4

The diamine of Example 1, 2.46 g (10 mmol), was dissolved in dimethylformamide, 10 ml, containing sodium acetate, 1 g. Citraconic anhydride, 2.85 g (25 mmol), was then added and the solution stirred for about 3 hours. Acetic anhydride, 3 ml, was introduced and stirring continued for two hours. After cooling, pouring in water, filtering, and recrystallizing from methanol and petroleum ether, the imide obtained was analyzed to contain: C, 62.27%; H, 4.48%; N, 6.6%; and P, 7.18%. Calculated values for $C_{23}H_{19}O_5N_2P$ were: C, 63.5%; H, 4.3%; N, 6.4%; and P, 7.14%.

EXAMPLE 5

The same diamine, 2.46 g (10 mmol), was added and the solution stirred for nearly 90 minutes. Citraconic anhydride, 1.23 g (11 mmol), was introduced and stirring continued for another 90 minutes. The bisimide was precipitated and purified as in Example 4. Analysis showed C, 61.3%; H, 4.4%; N, 6.3%; and P, 5.8%. Values calculated for $C_{22}H_{17}O_5N_2P$: C, 62.86%; H, 4.05%; N, 6.66%; P, 7.38%; and O, 19.05%.

EXAMPLE 6

Still the same amine, 1.23 g, (5 mmol), was dissolved in dimethylformamide, 5 ml, containing sodium acetate, 0.5 g. Citraconic anhydride, 0.615 g (5.5 mmol), was added to the solution. After 90 minutes of stirring, dichloromaleic anhydride, 0.915 g (5.5 mmol), was introduced and stirring was continued for 90 minutes. The resulting bisimide was precipitated and purified in the usual manner. Elemental analysis showed: C, 54.4%; H, 3.4%; N, 6.3%; P, 7.0%; O, 15.9%; and Cl, 14.0%. The calculated values for $C_{22}H_{15}O_5N_2PCl_2$ were: C, 54.09%; H, 3.07%; N, 5.74%; O, 16.39%; P, 6.35%; and Cl, 14.34%.

Some physical properties of laminates made with the new resins and graphite cloth, in the manner already described, were determined. On comparison with the laminates of the art, and for most contemplated uses, these properties were generally satisfactory. Some of the comparative data is shown in Table 1.

TABLE 1

| Component Resin | Tensile Strength (MN/m²) | Tensile Modulus (GN/m²) | Short Beam Shear (MN/m²) | Flexural Strength (MN/m²) |
|---|---|---|---|---|
| Example 2 resin | 413 | 50 | 37 | 863 |
| Epoxy | 690 | 80 | 75 | 940 |
| Phenolic | 580 | 73 | 41 | 515 |
| BismaleimideA[i] | 600 | 79 | 70 | 820 |

TABLE 1-continued

| Component Resin | Tensile Strength (MN/m²) | Tensile Modulus (GN/m²) | Short Beam Shear (MN/m²) | Flexural Strength (MN/m²) |
| --- | --- | --- | --- | --- |
| BismaleimideB[ii] | — | — | 38 | 610 |

[i]made with methylenedianiline
[ii]made with diaminodiphenylether

Evidently, some of the mechanical properties of the laminates made with the resins of the invention may be altered selectively and favorably by using a different unsaturated anhydride component and a different phosphine oxide component, as well as mixtures of said components, all chosen from the substances encompassed by the claims. The properties may also be altered somewhat by varying the processing parameters.

The flame and heat resistance of a typical resin of the present invention were measured by submitting laminates made with the resin and graphite cloth to conventional tests, namely thermogravimetric analysis carried out in a nitrogen atmosphere at a heating rate of 10° C. per minute, and the oxygen index method for measuring the flammability of plastics (A.S.T.M. D 2863-74). The composites were made in the manner earlier described and the results of the tests are compared to those of prior art laminates shown in Table 2.

TABLE 2

Flame and Heat Resistance of Graphite Cloth Laminates

| Resin | Cure Temperature (°C.) | Time (min.) | Char Yield at 800° C. (% weight) | LOI (% volume) |
| --- | --- | --- | --- | --- |
| Epoxy | 180[i] | 200[i] | 38 | 41 |
| Phenolic | 245 | 240 | 46 | 46 |
| BismaleimideA[ii] | to 315 | 115 | 50 | — |
| BismaleimideB[iii] | — | — | 46 | 47 |
| Phenolic-novolak | — | — | 46 | 50 |
| Polyethersulfone | — | — | 40 | 54 |
| Polyphenylsulfone | — | — | 47 | 52 |
| Example 1 | 270 | 30 | 62 | — |
| Example 2[iv] | 290 | 30 | 70 | >100 |
| Example 3 | 290 | 15 | 65 | — |
| Example 4 | 290 | 15 | 58 | — |
| Example 5 | 315 | 30 | 57 | — |
| Example 6 | 290 | 30 | 52 | — |

[i]The curing regimes for the first seven resins in the table involved conventional conditions designed to optimize the properties reported; for instance, the epoxy resin was cured a total of 250–290 minutes at a graduated temperature from 23 to 182° C.
[ii]Made with methylenedianiline.
[iii]Made with diaminodiphenylether.
[iv]The LOI has been determined on this sample because the resin has the lowest phosphorus contact and the highest char yield, thus being both more economical and satisfactory. The resins of Example 1 and 4 to 6, which contain more phosphorus are expected to show LOIs of equal quality.

As these results demonstrate, the heat and fire resistance of graphite composites made with the resins of this invention is outstanding, especially in terms of limiting oxygen index.

We claim:

1. A bisimide obtained by the condensation reaction of a polymerizable ethylenically unsaturated cyclic anhydride with a phosphorus-containing diamine of the formula

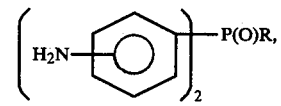

in which R stands for a methyl, ethyl, or phenyl group.

2. The bisimide of claim 1 wherein the anhydride is selected from the class consisting of maleic anhydride, dichloromaleic anhydride, citraconic anhydride, and mixtures thereof.

3. The bisimide of claim 2 wherein up to 50% of the molar quantity of the cyclic anhydride is replaced by benzophenonetetracarboxylic acid dianhydride.

4. The bisimide of claim 2 wherein the diamine is bis(3-aminophenyl)methylphosphine oxide.

5. A light weight laminate that comprises inorganic fibers embedded in a resin formed by the addition polymerization of the bisimide of claim 1.

6. The laminte of claim 5 where the inorganic fibers are in the form of a graphite cloth.

* * * * *